United States Patent Office 2,768,147
Patented Oct. 23, 1956

2,768,147

AROMATIC VINYL COMPOUND-ACENAPHTHENE COMPOUND CO-POLYMER AND PROCESS OF PRODUCING THE SAME

Helmut Meis and Hubert Sauer, Letmathe, in Westphalia, Germany, assignors to Rutgerswerke-Aktiengesellschaft, Frankfurt am Main, Germany No Drawing. Application April 14, 1953,
Serial No. 348,828

Claims priority, application Germany April 18, 1952

13 Claims. (Cl. 260—23)

This invention relates to mixed polymerization products and it has particular relation to products obtained by co-polymerization of acenaphthene or its derivatives with aromatic vinyl compounds. The invention also relates to a process for preparing such co-polymerization products.

It has been suggested previously to subject aromatic vinyl compounds by themselves, or in mixture with other polymerizable products, to polymerization. It has been also known that acenaphthylene can be polymerized by heating and that acenaphthene can be converted into condensation products by the action of formaldehyde.

It has now been found that acenaphthene and its substitution products, such as chlorinated acenaphthenes and acenaphthenes substituted by alkyl radicals, can be converted into mixed polymerizates by co-polymerization with aromatic vinyl compounds in the presence of anhydrous acid reacting catalysts which are capable of polymerizing aromatic vinyl compounds, particularly vinyl benzenes. As examples of aromatic vinyl compounds adapted to be used in carrying out the present invention styrene, alpha-methylstyrene, divinylbenzene, vinylanisol, vinylnaphthalene, vinylcarbazol, and mixtures of two or more of these substances are mentioned. Examples of acenaphthene compounds to be co-polymerized with said vinyl compounds are acenaphthene proper, 3-methylacenaphthene, 3,6-dimethylacenaphthene, 1-ethylacenaphthene, 5-isobutylacenaphthene, 4-chloroacenaphthene, 5-chloroacenaphthene, 1,2-dichloroacenaphthene, 5-bromoacenaphthene, or their mixtures. Catalysts suitable for carrying out the process of this invention are, for example, inorganic halides such as aluminum chloride, stannic chloride ($SnCl_4$), boron trifluoride, zink chloride, ferric chloride, titanium tetrachloride, and complex compounds of these substances, e. g. complex compounds of boron trifluoride, such as reaction products of $BF_3$ with organic acids, e. g. boron trifluoride acetic acid. Catalysts of this type are denoted in the appended claims anhydrous, acid reacting polymerization catalysts.

In carrying out the process of our invention, the character and proportions of the starting materials to be polymerized, as well as the nature and amount of the catalyst and the conditions of co-polymerization can be varied in order to obtain co-polymerization products of varying properties. Thus, by suitable selection of the beforementioned conditions oily, semi-solid or solid substances capable of various applications, can be obtained. The oily products can be used, for example, as softening agents, while the solid products can be used by themselves or in mixture with other natural or synthetic resins in lacquers and in artificial or synthetic materials. Furthermore, the products of the invention can be subjected to condensation for example with formaldehyde in order to modify their properties.

The process of the present invention can be carried out by dissolving the acenaphthene compound together with the aromatic vinyl compound in a solvent and adding the catalyst to this solution. Aliphatic or aromatic organic solvents such as carbon tetrachloride, benzene, toluene, and xylene, or other aliphatic or aromatic hydrocarbons can be used as solvents in carrying out co-polymerization according to our invention. After the addition of the catalyst, and slowing down of the reaction caused by the catalyst, the solution is heated for a period of time which depends on the conditions of the individual case, for example on the individual ingredients and solvents and the proportions used. By variation of the temperature and duration of heating, the properties of the co-polymerization products, particularly their consistency, can be varied.

From the resulting acid reacting polymerized solution, the catalyst can be removed by the action of alkaline reacting agents, for example by the addition of oxides, hydroxides or carbonates of alkaline metals or alkaline earth metals and subsequent filtration. The solvent and volatile substances present in the solution are removed by distillation preferably under vacuum, particularly when the last residue of said substances is removed. The co-polymerization product is obtained as the distillation residue.

The process of the invention can be carried out also in the presence of drying oils such as linseed oil, whereby polymerization products are obtained which have particular advantages when used as ingredients of lacquers.

In the following, "parts" refer to parts by weight if not otherwise stated.

Example 1

100 parts of styrene and 10 parts of acenaphthene are mixed under stirring at ordinary room temperature, i. e. 15° to 25° C., until the acenaphthene is dissolved. The resulting solution is diluted with 100 parts of xylene and to the diluted solution 2 parts of boron trifluoride acetic acid are added under stirring and cooling. After a short time, a violent action occurs. The reaction mixture is then subjected to distillation under vacuum whereby the solvent as well as the catalyst are removed.

The co-polymerized product obtained as the distillation residue, is highly viscous and it is, therefore, difficult to neutralize it with soda.

105 parts of a very viscous almost solid, sticky, slightly yellowish oil are thus obtained which is soluble in organic esters, chloroform, carbon tetrachloride and acetone.

Example 2

10 parts of acenaphthene are dissolved in the manner described in Example 1 and 100 parts of styrene and diluted with 100 parts of toluene. Co-polymerization is effected by the addition of 2 parts of boron trifluoride acetic acid. The solvent and the catalyst are removed by distillation whereby 100 parts of a bright yellow solid resin having a softening point of 86°–89° C. is obtained as the residue. This resin is soluble in organic esters, chloroform, carbon tetrachloride and acetone.

Example 3

100 parts of styrene, 100 parts of acenaphthene and 250 parts of toluene are mixed under stirring at room temperature until a solution is formed. Polymerization is effected by addition of 10 parts of boron trifluoride acetic acid to said solution. After the reaction has subsided, the solution is heated under reflux for about 3 hours. By subjecting the heated solution to distillation under vacuum, 200 parts of a very viscous brown oil are obtained which is soluble in organic esters, acetone, chloroform, and carbon tetrachloride and less soluble in alcohols.

Example 4

A solution consisting of 100 parts of styrene, 20 parts of acenaphthene and 100 parts of xylene, is mixed under stirring with 5 parts of boron trifluoride acetic acid. Polymerization proceeds slowly and requires heating of the solution under reflux for about 3 hours. The solution is then subjected to distillation under vacuum whereby 100 parts of a very viscous, tough, sticky resin are obtained, which is soluble in the solvents mentioned in Example 3.

Example 5

To a solution obtained by stirring at room temperature, 500 parts of styrene, 100 parts of acenaphthene and 300 parts of toluene, 3 parts of boron trifluoride acetic acid are added. After the reaction has subsided, the solution is subjected to distillation under vacuum. About 600 parts of a bright resin having a softening point of 54°–57° C. are thus obtained. The resin is soluble in organic esters, chloroform, carbon tetrachloride and acetone.

Example 6

10 parts of acenaphthene are dissolved under stirring in a mixture of 100 parts of styrene and 100 parts of xylene and to the solution 1 part of $SnCl_4$ is added. After the reaction has subsided, the solution is heated to boiling temperature, neutralized with sodium carbonate and filtered. The solvent is removed by distillation under vacuum. 100 parts of a very viscous bright resin are thus obtained.

Example 7

24 parts of styrene, 192 parts of linseed oil for varnish, 10 parts of acenaphthene and 250 parts of xylene are mixed under stirring until all ingredients are completely dissolved and to the solution 2 parts of boron trifluoride acetic acid are added. In order to complete polymerization, the solution is heated to boiling for about 15 minutes, neutralized with sodium carbonate and filtered. The solution is removed by distillation under vacuum whereby 190 parts of a bright oil having good drying properties are obtained.

Example 8

50 parts of styrene, 50 parts of alpha-methylstyrene, 25 parts of acenaphthene and 100 parts of toluene are mixed under stirring until the acenaphthene is dissolved and to the solution 1 part of boron trifluoride diacetic acid is added. After the violent reaction has subsided, the solution is neutralized with sodium carbonate, filtered and the solvent is removed by distillation under vacuum. 120 parts of a bright highly viscous resin are thus obtained. The resin is soluble in organic esters, ketones, mineral spirits, and carbon tetrachloride. It shows good solubility also in oils.

Example 9

100 parts of alpha-methylstyrene, 25 parts of acenaphthene, 100 parts of toluene and 1 part of boron fluoride diacetic acid are treated in the manner described in Example 7. 120 parts of a very bright resin of low viscosity are thus obtained. The resin is soluble in organic esters, ketones, mineral spirits, carbon tetrachloride and in oils.

Example 10

A solution consisting of 100 parts of styrene, 10 parts of 3-methylacenaphthene, 5 parts of 5-chloroacenaphthene and 100 parts xylene is mixed under stirring with 4 parts of boron trifluoride acetic acid and is heated under reflux for 1½–2 hours. By distilling off the volatile substances under vacuum a viscous resinous substance is obtained as the residue.

10–30% of the 5-chloroacenaphthene can be substituted by 5-bromoacenaphthene in this example.

Example 11

10 parts of acenaphthene, 20 parts of alpha-methylstyrene and 5 parts of 3,6-dimethylacenaphthene are mixed under stirring with 150 parts of toluene until a clear solution is obtained. To the latter one part of boronfluoride diacetic acid is added. After the co-polymerization reaction has subsided, the solution is neutralized with sodium carbonate, filtered and the resin formed by polymerization is recovered by subjecting the solution to distillation under vacuum.

Example 12

To a solution consisting of 100 parts of styrene, 10 parts of 1-ethylacenaphthene and 100 parts of toluene, 2 parts of borontrifluoride acetic acid are added in order to effect copolymerization. The polymerized mixture is submitted to neutralization with calcium hydroxide, filtration and distillation under vacuum. The residue is a yellow solid resin having a softening point of about 80°–83° C.

Instead of 1-ethylacenaphthene, an equal amount of 5-isobutylacenaphthene can be used under otherwise equal conditions in this example.

Example 13

A clear solution is prepared by mixing under stirring 20 parts of acenaphthene, 120 parts of styrene and 100 parts of xylene. 10 parts of boron trifluoride are introduced into the solution which is then heated under reflux for 3½–4 hours. The solution is then neutralized with barium carbonate, filtered and the resin formed by co-polymerization is separated from the volatile ingredients by distillation under vacuum.

Instead of the boron trifluoride, 8 parts of the compound $H_3PO_4 \cdot BF_3$ can be used as catalyst.

Example 14

10 parts of acenaphthene and 5 parts of 4-chloroacenaphthene are dissolved under stirring in a mixture of 95 parts of styrene and 100 parts of xylene and to the solution of 2 parts of $AlCl_3$ are added. After the reaction is completed, the solution is heated to boiling temperature, neutralized with sodium carbonate, filtered and the solvent is removed by distillation under vacuum. The co-polymerization product is a bright resin which is solid at ordinary room temperature.

Instead of the 2 parts of $AlCl_3$, 2 parts of $ZnCl_2$, or $TiCl_4$ or a mixture of 1 part of $SnCl_4$ with 1 part of $FeCl_3$ can be used as catalyst in this example.

Example 15

To a solution containing 10 parts of acenaphthene, 5 parts of 1,2-dichloroacenaphthene, 20 parts of N-vinyl carbazol monomer, 80 parts of styrene and 100 parts of toluene, 2 parts of borontrifluoride acetic acid are added. The solution is heated under reflux to boiling for 10–15 minutes in order to complete polymerization, is then neutralized with potassium carbonate, filtered and subjected to distillation under vacuum. The distillation residue is a very viscous bright resin.

Example 16

50 parts of styrene, 50 parts of o-chlorostyrene, 100 parts of acenaphthene and 250 parts of toluene are mixed under stirring at room temperature of 15°–25° C. until a clear solution is formed. Polymerization is effected by adding 8 parts of chloracetatofluoboric acid to the solution. After the reaction has subsided, the solution is heated under reflux for 1½–2 hours. The co-polymerization product which is obtained by distillation under vacuum, is a very viscous yellow-brown oil.

10–50% of the chloracetatofluoboric acid catalyst can be substituted by an equal amount of lactatofluoboric, oleatofluoboric or benzoatofluoboric acid.

Example 17

100 parts of beta-vinyl naphthalene, 10 parts of acenaphthene and 100 parts of xylene are mixed under stirring at 20° C. until complete solution occurs. To the solution, 2 parts of borontrifluoride acetic acid are added under stirring and cooling. After the reaction has subsided, the solution is distilled under vacuum in order to separate the resin formed.

Instead of 100 parts of beta-vinyl-naphthalene, a mixture of 50 parts of styrene, 25 parts of alpha-vinylnaphthalene and 25 parts 2,3-dichlorostyrene, or 25 parts of a mixture of dichlorostyrenes, can be used in this example.

Example 18

To a solution containing 10 parts of acenaphthene, 20 parts of o-divinylbenzene, 20 parts of styrene, 100 parts of linseed oil, and 100 parts of toluene, 2 parts of borontrifluoride acetic acid ($CH_3COOH.BF_3$) are added. The solution is heated under reflux for 30–45 minutes, neutralized with $Na_2CO_3$, filtered and distilled under vacuum, whereby the polymerization product is obtained in form of an oil as the residue.

Example 19

20 parts of styrene, 150 parts of perilla oil, 10 parts of acenaphthene and 200 parts of xylene are mixed under stirring until all ingredients are dissolved and to the solution 2 parts of borontrifluoride diacetic acid

($2CH_3COOH.BF_3$)

are added. Polymerization is completed by heating under reflux for 10–15 minutes. Finally the mixture is neutralized with sodium carbonate, filtered and distilled under vacuum. The residue is a bright oil having good drying properties.

In the above procedure, the perilla oil can be partly or wholly replaced by an equal amount of another drying oil, such as poppy oil, tung oil, oiticica oil, soybean oil, or dehydrated castor oil.

Example 20

10 parts of acenaphthene, 20 parts of o-vinylanisol and 20 parts of styrene are mixed with 100 parts of xylene to a clear solution, to which 2 parts of borontrifluoride acetic acid are added. The solution is heated under reflux for 1½ to 2 hours, neutralized with $Na_2CO_3$, filtered and distilled under vacuum, whereby, as the residue, a viscous brown resin is obtained. This resin is soluble in ester solvents, such as butyl acetate, ethyl acetate, isopropyl acetate, chloroform and carbon tetrachloride.

It will be understood that this invention is not limited to the specific details described above and can be carried out with various modifications. For example, instead of toluene and xylene, or in mixture with them, other solvents e. g. solvent naphtha, mixtures of toluene and/or xylene, with ethyl acetate, butyl acetate, carbon tetrachloride, or cyclohexanone can be used. Furthermore, the co-polymerization products of the invention can be prepared by emulsion polymerization, e. g. by mechanically dispersing the ingredients in water containing a catalyst and a stabilizer, such as sodium lauryl sulfate, ammonium abietate or a soap and effecting co-polymerization in the dispersion. Distillation under vacuum can be carried out under an absolute pressure of for example 150–400 mm. Moreover, the co-polymerization products can be subjected to further tareatment in order to modify their properties, for example to condensation with formaldehyde. These and other modifications can be made without departing from the scope of the invention, as defined in the appended claims.

Example 21

A co-polymerization product with formaldehyde can be made as follows:

50 parts of resin (produced according to the example of our patent) are dissolved in 50 parts of benzene, mixed with 100 parts of formaldehyde (37%) and 15 parts of sulfuric acid (concentrated), and are boiled for 3 hours under refluxing. The resulting solution is washed with sodium carbonate, until the solution is free of acid, and washed with water. After the removal of the solvent 60 parts of a light coloured resin with a melting-point of 70–73° C. are obtained. The resin is soluble in aromatic and aliphatic hydrocarbons, esters, acetone, and it is not soluble in alcohol.

What is claimed is:

1. As a new polymerized product, a co-polymerization product of a polymerizable aromatic vinyl compound with an ingredient selected from the group consisting of acenaphthene, monohalogenated and dihalogenated acenaphthene and acenaphthene substituted by a lower alkyl radical, the acenaphthene compound being present in the co-polymerization product in the range of 10–100% based on the weight of the aromatic vinyl compound.

2. A co-polymerization product as claimed in claim 1, in which the co-polymerized ingredients are styrene and acenaphthene.

3. A new polymerized product as claimed in claim 1, consisting of styrene, acenaphthene and a drying oil and containing drying oil in the range of 66.6% to 85%, the balance consisting of styrene and acenaphthene.

4. A new polymerized product as claimed in claim 3, in which the drying oil is linseed oil.

5. A new polymerized product as claimed in claim 1, in which the acenaphthene compound is a chlorinated acenaphthene.

6. A new polymerized product as claimed in claim 1, in which the acenaphthene compound is a methyl-substituted acenaphthene.

7. A new polymerized product as claimed in claim 1, in which the acenaphthene compound is an ethyl-substituted acenaphthene.

8. A process for producing a co-polymerization product of a polymerizable aromatic vinyl compound with an ingredient selected from the group consisting of acenaphthene, monohalogenated and dihalogenated acenaphthene, and acenaphthene substituted by a lower alkyl radical, in which said ingredients are subjected to co-polymerization in the presence of a catalyst selected from the group consisting of acid reacting inorganic halides and acid reacting complex compounds of said halides, the acenaphthene compound being used in the range of 10% to 100% based on the weight of the aromatic vinyl compound.

9. A process as claimed in claim 8, in which the catalyst is a complex compound of $BF_3$ and acetic acid.

10. A process as claimed in claim 8, in which co-polymerization is carried out in an organic solvent.

11. A process as claimed in claim 8, in which the polymerized composition is neutralized with an alkaline reacting compound, and filtered.

12. A process as claimed in claim 8, in which co-polymerization is carried out in an organic solvent selected from the group consisting of toluene and xylene.

13. A process as claimed in claim 8, in which the resulting co-polymerization product is subjected to condensation with formaldehyde.

References Cited in the file of this patent

UNITED STATES PATENTS

| | | |
|---|---|---|
| 1,975,959 | Lawson | Oct. 9, 1934 |
| 2,445,181 | Miller | July 13, 1948 |
| 2,510,647 | Miller | June 6, 1950 |
| 2,568,313 | Woolhouse | Sept. 18, 1951 |
| 2,624,726 | Serniuk | Jan. 6, 1953 |

FOREIGN PATENTS

| | | |
|---|---|---|
| 680,441 | Great Britain | Oct. 8, 1952 |
| 687,521 | Great Britain | Feb. 18, 1953 |